April 6, 1937.  A. O. SAMUELS ET AL  2,076,096

ELECTRIC PERCOLATOR

Filed Sept. 20, 1932  2 Sheets-Sheet 1

INVENTORS
ABE O. SAMUELS
ALVIN DEWAYNE KEENE
BY
ATTORNEY

Patented Apr. 6, 1937

2,076,096

UNITED STATES PATENT OFFICE 2,076,096

ELECTRIC PERCOLATOR

Abe O. Samuels and Alvin Dewayne Keene, Rochester, N. Y., assignors to Samson-United Corporation, Rochester, N. Y.

Application September 20, 1932, Serial No. 634,038

34 Claims. (Cl. 219—43)

This invention relates to electric percolators and has for one of its obects to provide such a percolator with means whereby the operation of the percolator may be regulated to automatically produce light, medium or dark coffee.

Another object of this invention is to provide a percolator which may be set to percolate continuously or for a predetermined time period.

Another object of this invention is to provide the percolator with an auxiliary heating unit which operates to keep the coffee hot in its light, medium or dark state.

A further object of this invention is to provide regulating means whereby the timing of the heating unit automatically adjusts itself to the quantity of coffee to be percolated.

Another object of the invention is to provide automatically operated heating means which will not repercolate the coffee after it has been made.

A further object of this invention is to provide automatic regulating means which automatically corrects any variation in the power input of the heating unit of the percolator.

Another object of this invention is to have the auxiliary heating unit operate as the lockout for the main heating unit of the percolator.

These and other objects and attendant advantages will become more readily apparent from the detailed description of the invention which follows, reference being had to the accompanying drawings in which Figure 1 is a side elevation partly broken away of the lower portion of a percolator equipped with the automatically controlled heating apparatus.

In the several figures of the drawings like reference numerals indicate like parts.

The automatic heat control mechanism forming the subject matter of this invention includes a thermostatic control in combination with two heating units, one a large unit for the operation of the percolating mechanism and the other a small unit for use in keeping the percolated coffee hot without repercolating it. In addition a second thermostatic control in series with the aforementioned thermostatic control operates as a safety switch in place of a fusible element to protect the percolator vessel from overheating after the coffee has been drained from the percolator or has evaporated from it or should the percolator be started without any water.

Figure 1:
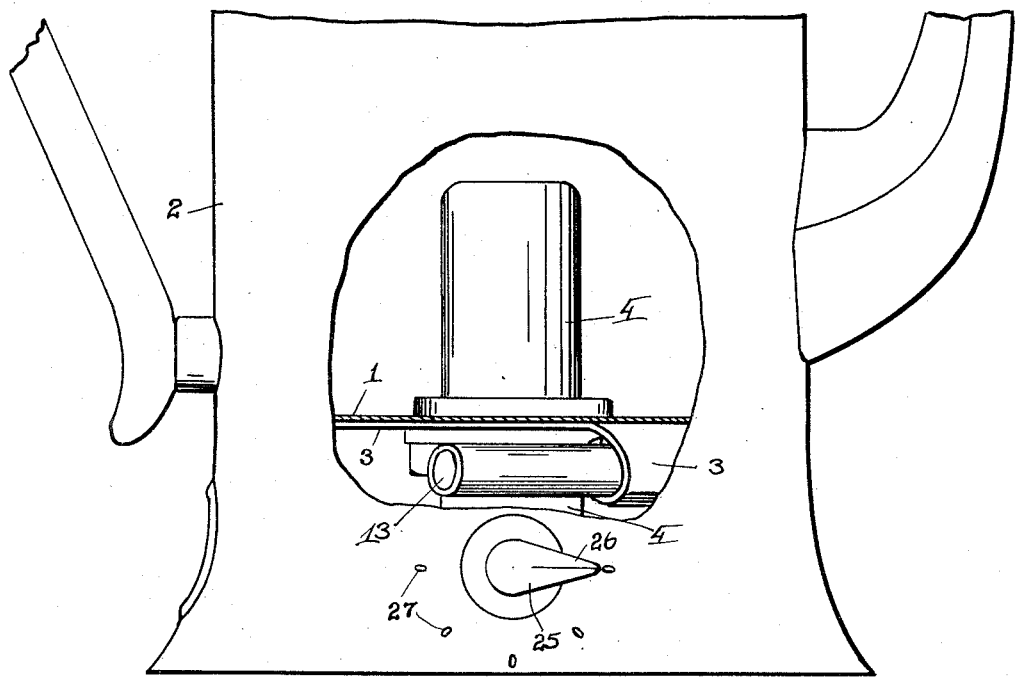
Figure 2:
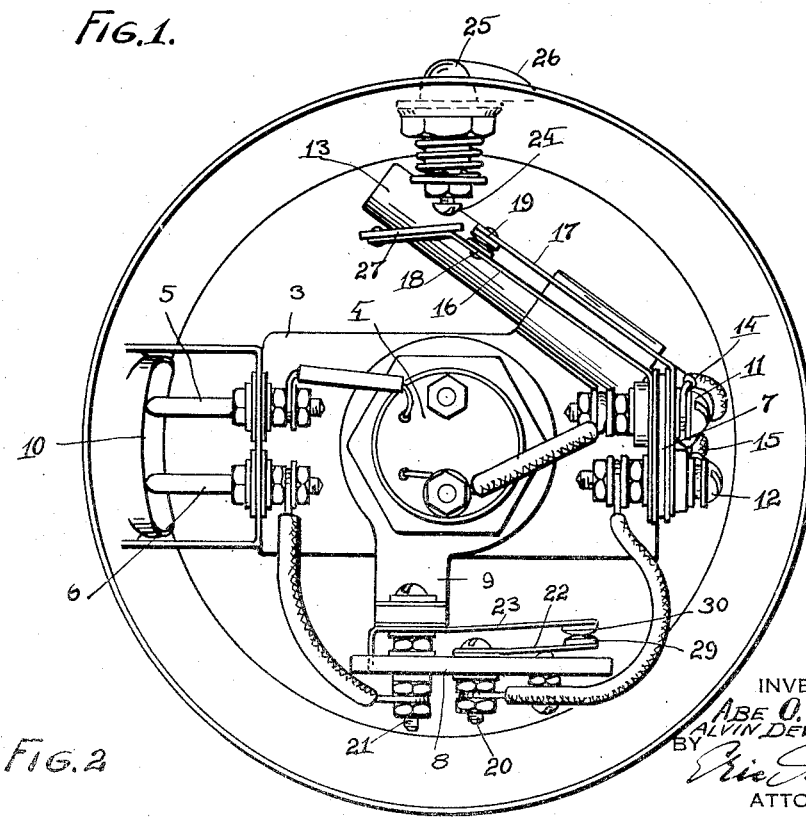
Figure 2 is a bottom plan view of the percolator and the heating apparatus.
Figure 3:
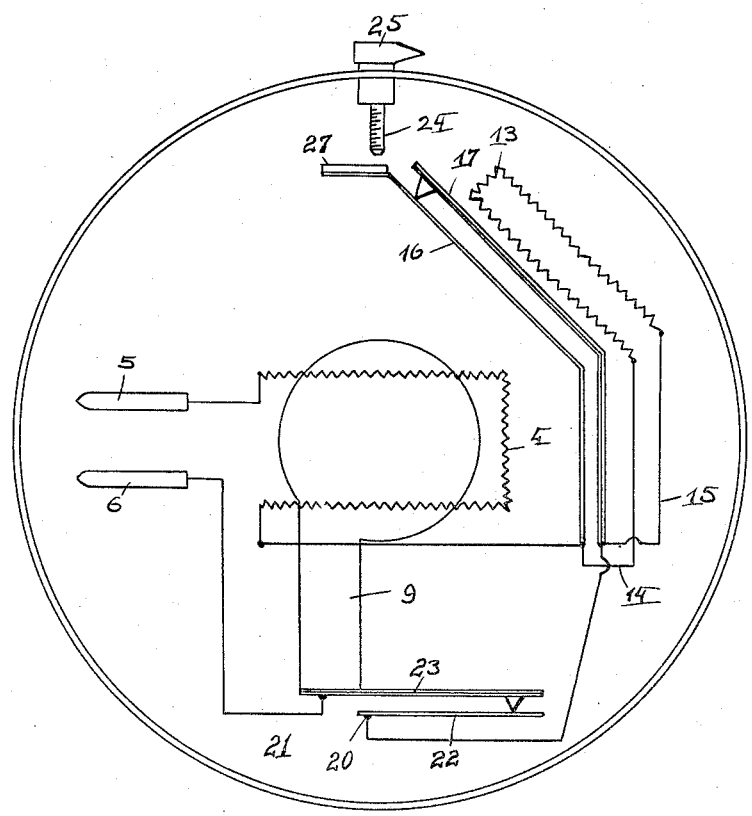
Figure 3 is a diagrammatic view of the automatically controlled heating apparatus.

As illustrated in Figures 1 and 2 all of the mechanism is suitably mounted to the bottom 1 of the percolator vessel 2. For this purpose an auxiliary base 3 is clamped or otherwise fastened to the under side of the bottom 1 so that the large heating unit 4 which is centrally located within the percolator and projects thru the bottom 1 and the base 3 may be suitably anchored thereto. On one side of the heating unit 4 the auxiliary base is bent down to form the support for the terminal pins 5 and 6 and on the other side of the heating unit 4 the base is bent down to form the support for the automatic thermostatic control stwitch 7. Both the terminal pins and the thermostatic control are electrically insulated from the base in any suitable manner. The safety thermostat switch 8 is supported by a lug which is bent up from the heat conducting bracket 9. This bracket encircles the lower portion of heating unit 4 and is clamped against it and the base 3 so as to readily absorb the heat from the heating unit in the bottom of the percolator and transmit it to the thermostat switch 8 for a purpose hereinafter described. It has been found that such a bracket will conduct the heat to the thermostat in the most efficient manner.

The electric current is connected to the terminal pins by means of a suitable slip socket which is telescoped over them thru the opening 10 in the side of the percolator. The heating unit 4, thermostat switch 7 and thermostat switch 8 are electrically connected in series with each other, the terminal pin 5 being connected to the heating unit 4 and the terminal pin 6 being connected to the thermostat switch 8.

The thermostat switch 7 has the terminals 11 and 12 and across these terminals is connected the auxiliary heating unit 13, the terminal end 14 of this heating unit being connected to terminal 11 and the terminal end 15 of this same heating unit being connected to terminal 12 of the thermostat switch 7. The terminals 11 and 12 of the thermostat switch are electrically connected to the spring member 16 and bimetallic member 17 respectively. These members carry the contact buttons 18 and 19 respectively which are normally held in contact with each other due to the tension of the spring member 16.

The thermostat switch 8 has the terminals 20 and 21, of which terminal 20 is electrically connected to the spring member 22, while terminal 21 is connected to the bimetallic member 23. The normal flow of the electric current is thus from the terminal pin 5 thru the heating unit 4 to the thermostat switch 7 and while this switch is closed, from this switch to the second thermostat switch 8 and as long as it is closed thru the latter to the terminal pin 6.

The normal flow of the electric current thus operates to heat the heating unit 4 to start the percolator. During the percolating of the coffee the heat radiated from the heating unit 4 also operates on the thermostat switch and causes the bimetallic member 17 thereof to flex in a direction away from the spring member 16. As long as this spring member is free to follow the movement of the bimetallic member, due to the tension of the spring member, the contact buttons 18 and 19 remain in contact with each other and keep the switch closed to have the electric current continue to heat the heating unit 4 and keeps the percolator operating. As the percolator continues to operate it produces first a light, then a medium and finally a dark coffee, depending on how long the coffee is allowed to percolate.

In order to produce a light coffee, it is therefore necessary to stop the coffee from percolating within a shorter time than is necessary for the medium or the dark coffee. The time necessary to percolate the coffee for the various degrees in the strength thereof is determined by the thermostat switch 7 which is made to operate to open the electric circuit therethru in accordance with these time periods.

This is done by the adjustable stop pin 24 which, in the form illustrated in Figure 2, is threaded thru a suitable sleeve fixed in the wall of the percolator and has a pointer head 25 fastened to the outside thereof. In rotating this pointer head, the pointer 26 thereof will point to the successive radial indicating lines 27 which are spaced to have the thermostat switch operate in order to open the electric circuit to produce the desired strength coffee. Turning the pointer head 25 moves the inner end of the stop pin toward or away from the insulating block 27 carried by the outer free end of the spring member 16. The distance between this block and the stop pin is thus increased or decreased to allow the spring member 16 to follow a long or short distance the movement of the bimetallic member 17. On the operation of the heating unit at a constant voltage the bimetallic member is made so as to flex a predetermined distance during a fixed time period and when at the end of this movement of the bimetallic member the spring member 16 is held against further movement with the bimetallic member, the contact buttons 18 and 19 of the spring member and bimetallic member respectively, separate as the bimetallic member continues to flex. The electric circuit is thus opened by the thermostat switch. Instead of passing thru the thermostat the electric current then passes thru the auxiliary heating unit 13 which is shunted across the terminals of the thermostat switch, as above described. This auxiliary heating unit has a comparatively low current consumption compared with that of the main heating unit 4, so that while current continues to flow thru the electric circuit of the percolator, the reduction of the current by the auxiliary heating unit is such that the main heating unit will only partially be heated thereby causing the coffee to stop percolating.

The heat radiated by the auxiliary heating unit 13 below the bottom of the percolator is designed to keep the percolated coffee hot without causing it to repercolate and for this reason is slightly spaced from the bottom 1 as illustrated in Figure 1.

From the foregoing it will be seen that the indicator may be set to open the thermostat switch 7 after the coffee has percolated any desired period, for light coffee a short period and for medium and dark coffee a correspondingly longer period. Of course a variation in the power input will either shorten or length the time period required for percolating the coffee to the desired strength. At the end of the timed percolating period the auxiliary heating unit will keep the coffee hot without repercolating it. The auxiliary heating unit also creates sufficient heat in close proximity to the bimetallic member 17 of the thermostat switch to keep this switch open so that at no time after the coffee has been percolated its desired period can the thermostat switch close to allow the current to operate the main heating unit and shut out the auxiliary heating unit.

The thermostat switch 8 is a safety switch and takes the place of a fuse for the protection of the soldered joints of the percolator. This switch is connected in series with the thermostat switch 7 while it is closed and is connected in series with the auxiliary heating unit when the thermostat switch 7 is open. The thermostat switch 8 is set to open the circuit between the contact buttons 29 and 30 carried by the spring member 22 and the bimetallic member 23 respectively. This takes place when the percolator is started without water or when all of the coffee has inadvertently evaporated from the percolator and the heating unit 4 or the auxiliary heating unit raises the temperature of the percolator shell above the boiling point of the coffee. The joint between the bottom and the shell of the percolator, as well as other joints between the various parts making up the percolator, are usually all soldered joints and while these joints readily withstand the degree of heat necessary to make the coffee percolate and keep it percolating, the increased heating effect on the percolator by the heating units after the liquid contents thereof have disappeared will soon melt the soldered joints and destroy the percolator. Therefore as soon as the temperature of the bottom 1 of the percolator begins to rise above the temperature necessary to percolate the coffee, this increased temperature which is conducted thru the copper bracket 9 operates to deflect the bimetallic member 23 away from the spring member and opens the electric circuit between the contact buttons 29 and 30. This shuts off the current to both of the heating units and keeps them from overheating the percolator.

We claim:

1. In an electrically heated vessel the combination of heating means for heating said vessel, heat controlled operating means operated by said heating means, normally inoperative second and separate heating means for heating said vessel, means cooperating with said heat controlled operating means for shutting off said first heating means and turning on said second operating means, said second heating unit having sufficient heating capacity and being in close relationship to said heat controlled operating means and said vessel so as to keep the heat controlled operating means in its operated position to hold said first heating means inactive and said second heating means active while heating said vessel to a predetermined temperature below that provided by said first heating means.

2. In an electrically heated vessel the combination of two separate heating means for heating the contents of said vessel, heat controlled operating means operated by one of said heating means for causing said heating means to become partially inactive and said second heating means active, said second heating means having sufficient heating capacity and being arranged to heat the contents of said vessel to a temperature below that of the first heating means and continue to operate said heat controlled operating means and keep it in its operated position produced by the full heating means.

3. In an electrically heated vessel the combination of two separate and independently operating heating means for heating said vessel, heat controlled operating means operated by the first heating means for regulating said first heating means and causing the operation of the second heating means to assume the heating of said vessel independent of said first heating means and keep said first heating means substantially inactive and second heat controlled operating means for shutting off both said first and said second heating means.

4. In a thermostatic control for electrical heating units the combination of a main heating unit having a large current consumption and correspondingly large heating capacity, a thermostatically operated switch electrically connected in series with said main heating unit, an auxiliary heating unit of small current consumption and correspondingly small heating capacity electrically connected across said thermostatically operated switch and in series with said main heating unit to cause the electric current to pass thru said auxiliary heating unit on the operation of said thermostatically operated switch by the heat generated by said main heating unit and keep said switch continually in its operated position by the heat generated by said auxiliary heating unit.

5. In a percolator the combination of two separate and independently operating heating means for operating said percolator, a heat controlled switch operated by the independent operation of one of said heating means for shutting off said heating means, the other of said heating means being operated by said heat controlled operating means to take the place of said first heating means and keep said first heating means shut off while said second heating means remain continually operative, a second heat controlled switch electrically connected in series with said first named switch and adapted to be operated by excessive heat generated by either of said heating units.

6. In a percolator the combination of two separate and independently operating heating means for operating said percolator, heat controlled operating means operated by the independent operation of one of said heating means for reducing the heat generated by said heating means, the other of said heating means being operated by said heat controlled operating means to keep said first heating means partially inoperative while said second heating means remain continually operative and manually operated means cooperating with said heat controlled operating means to secure the operation of said heat controlled operating means at the end of a predetermined time interval.

7. In an electric percolator the combination of an electric circuit, an electric heating unit connected in said circuit for operating said percolator, a thermostatically controlled switch operated by the heat generated by said heating unit to open the electric circuit after a predetermined time interval from the beginning of the operation of said percolator to stop the operation of said percolator by said heating unit, a second electric heating unit shunted around said switch to operate on the opening of said switch operative to generate a low heat sufficient to keep said switch open but keep said first heating unit from operating said percolator.

8. In an electric percolator the combination of a liquid container, a heating chamber on the under side of the bottom of said liquid container, an electric heating unit of large current consumption mounted to the bottom of said container and exposed to the inside thereof, a thermostatically controlled switch mounted in said heating chamber, a second heating unit of small current consumption mounted in said heating chamber, an electric circuit connecting said first heating unit in series with said switch with said second heating unit shunted around said switch and manually operated adjusting means for timing the opening or closing of said switch on the operation thereof by said first heating unit, said second heating unit creating sufficient heat to prevent the closing of said switch after being opened by said first heating unit.

9. In a percolator the combination of a liquid container, a heating chamber separated from said container by the bottom thereof, an electric heating unit mounted to said bottom to transmit its heat partially to the inside of said container and partially to the inside of said heating chamber, a thermostatically controlled switch for controlling the electric current for said heating unit located within said heating chamber and operated by the heat generated by said heating unit and transmitted into said heating chamber, a second heating unit located within said heating chamber and normally inactively connected to the electric circuit of said switch while said switch is closed, said second heating unit being actively connected in the circuit of said switch on the opening of said switch by the heat transmitted from said first heating unit and continued to be actively connected by the heat generated by said second heating unit, said second heating unit operating to keep the temperature of the contents of said container at a uniform heat without causing the contents to percolate.

10. In a percolator the combination of a liquid container, a heating chamber separated from said container by the bottom thereof, an electric heating unit mounted to said bottom to transmit its heat partially to the inside of said container and partially to the inside of said heating chamber, a thermostatically controlled switch for controlling the electric current for said heating unit located within said heating chamber and operated by the heat generated by said heating unit and transmitted into said heating chamber, a second heating unit located within said heating chamber and normally inactively connected to the electric circuit of said switch while said switch is closed, said second heating unit being actively connected in the circuit of said switch on the opening of said switch by the heat transmitted from said first heating unit and continued to be actively connected by the heat generated by said second heating unit, said second heating unit operating to keep the temperature of the contents of said container at a uniform heat without causing the contents to percolate, a second thermostatically controlled switch, a heat conducting bracket connecting the container bottom with said second thermostatically controlled switch to shut off the electric current to said first and second heating unit on the heating of the bottom of said container above a predetermined temperature by either said first or said second heating unit.

11. In an electric percolator the combination of a liquid container, a heating chamber below said container, an electric heating unit for heating the liquid contents of said container and heating said heating chamber, a single thermostatically controlled switch and a second electric heating unit cooperating with said thermostatically operated switch for cutting out said first electric heating unit and providing a constant reduced heat for said heating chamber by said second electric heating unit, said thermostatically controlled switch being arranged to have said second heating unit transmit sufficient heat to said thermostatically controlled switch to keep said switch operated without the aid of said first heating unit.

12. In an electrically heated vessel the combination of two separate and independently operating heating means, heat controlled operating means operable by both of said heating means and cooperating with one of said heating means to shut off and turn on said second heating means and cooperating with said second heating means to have said second heating means continue to operate said heat controlled operating means and heat said vessel to a constant lower temperature on the elimination of said first heating means.

13. In an electrically heated vessel the combination of a heating chamber, a primary heating unit for heating said vessel and said heating chamber, heat controlled operating means in said heating chamber and operated by said primary heating unit for shutting off said primary heating unit, a normally inactive and separate secondary heating unit located entirely within said heating chamber and turned on by said heat controlled operating means on the shutting off of said primary heating unit, said secondary heating unit having sufficient heating capacity and being in close relationship with said heat controlled operating means so as to continue the operation of said heat controlled operating means by transmitting sufficient heat thereto and thus keeping said primary heating unit shut off and said secondary heating unit turned on.

14. In an electrically heated vessel the combination of a heating chamber, heat controlled operating means within said heating chamber, two independent heating units for heating said vessel, one of said heating units projecting into said vessel and being adapted to be turned off by said heat controlled operating means, the other of said heating units being entirely located within said heating chamber and being adapted to be turned on by said heat controlled operating means on the operation thereof by said first heating unit, said second heating unit having sufficient heating capacity and being in close relationship to said heat controlled operating means and said vessel to keep the contents of said vessel heated without the aid of said first heating unit.

15. In an electrically heated vessel the combination of heat controlled operating means, two independent heating units for heating said vessel, one of said heating units having a large heating capacity and being arranged to heat the contents of the vessel to the boiling point, said heating unit of large heating capacity operating said heat controlled means so as to cause said heat controlled means to shut off said heating unit of large heating capacity and turn on the other of said heating units, said second heating unit being in close relationship to said heat controlled operating means and having sufficient heating capacity to keep said heat controlled means operated and heat said vessel without the aid of said first heating unit to a temperature below the boiling point.

16. In an electric percolator the combination of a liquid container, an electric heating unit for heating said vessel, a switch therefor, a thermostat having a movable thermo-responsive member operated by heat radiated from the heated vessel, and adjustable means regulating the movement of said thermostatic member to time the operation of said switch by movement of said thermo-responsive member.

17. In an electric percolator the combination of a liquid container, an electric heating unit for heating said container, a switch therefor, a thermostat having a movable thermoresponsive member operated by heat radiated from the heated container and adjustable means cooperating with said switch to time the operation of said switch by the movement of said thermoresponsive member.

18. In an electric percolator the combination of a liquid container, an electric heating unit for heating said container, a switch therefor, a thermostat having a movable thermoresponsive member operated by heat radiated from said liquid container, an adjustable member cooperating with said thermostat to cause a predetermined delayed operation of said switch by said thermoresponsive member during the movement thereof.

19. In an electric percolator the combination of a liquid container, an electric heating unit for heating said liquid container, a switch therefor, a thermostat having a movable thermoresponsive member operated by heat radiated from said liquid container, an adjustable member cooperating with said switch to effect a predetermined delayed operation of said switch by said thermostat on the movement of said movable thermoresponsive member.

20. In an electric percolator, the combination of a liquid container, an electric heating unit for heating said liquid container, a switch therefor, comprising a spring member and a thermostatic member, a contact carried by each of said members and adjustable means for arresting the movement of one of said members to cause a movement of one of said contacts independent of the other of said contacts during the movement of said thermostatic member.

21. In an electric percolator, the combination of a liquid container, an electric heating unit for heating said liquid container, a switch therefor comprising a spring member and a thermo-responsive member, a contact carried by each of said members, said members being movable with their contacts in contact with each other on the movement of said thermo-responsive member by the heat generated by said electric heating unit and means for arresting the movement of said spring member to stop the joint movement of said member at a predetermined time period and cause said thermo-responsive member to continue to move separately and cause said contacts to separate and open the switch.

22. In an electric percolator the combination of a liquid container, a heating unit for heating said container, a switch therefor comprising a pair of flexible members, a pair of contacts separating said flexible members, one of said flexible members being thermo-responsive to the heat radiated from the heated liquid container so as to cause said flexible members to jointly flex with their contacts in contact with each other and adjustable means for arresting the flexing of one of said flexible members at a predetermined time period to cause said contacts to separate.

23. In an electrically heated vessel the combination of a large capacity and a separate small capacity heating unit, heat controlled operating means cooperating with said large capacity heating unit to shut off said large capacity heating unit and turn on said small capacity heating unit, said small capacity heating unit having sufficient heating capacity and cooperating with said heat controlled operating means to continue to operate the heat controlled operating means and heat said vessel on the elimination of said large capacity heating unit to a constant lower temperature.

24. In an electric percolator the combination of a liquid container, an electric heating unit for heating said container, a movable thermoresponsive member for controlling the operation of said electric heating unit and means for variably limiting the movement of said thermo-responsive member for regulating the time period for the operation of said heating unit.

25. In an electric percolator the combination of a liquid container, an electric heating unit for heating said container, a thermostatically operated switch including a thermoresponsive member, and means for variably limiting the movement of said thermoresponsive member.

26. In an electric percolator having an electric heating unit, a thermostatically controlled switch for controlling said heating unit and comprising a pair of spring members of which one member is bimetallic, contacts between said spring members normally held together by said spring members and means for arresting the movement of one of said spring members on its movement by the bimetallic spring member so as to separate said contacts between said spring members.

27. In a percolator having an electric heating unit, a thermostatically controlled switch including a movable thermo-responsive member for the control of said heating unit, and adjustable means on the outside of said percolator for variably limiting the movement of said thermo-responsive member so as to effect the operation of said switch by said thermo-responsive member at variable positions in the movement thereof.

28. In a percolator having an electric heating unit, a thermostatically controlled switch including a movable thermo-responsive member for the control of said heating unit, a dial on the outside of said percolator and means operated by said dial for variably limiting the movement of said thermo-responsive member so as to effect an operation of said switch by said thermo-responsive member at a predetermined time period during the movement thereof.

29. In a percolator having an electric heating unit, a thermostatically controlled switch including a movable thermo-responsive member for the control of said heating unit, and manually operated means on the outside of said percolator for variably limiting the movement of said thermo-responsive member for effecting the operation of said switch at predetermined time periods during the movement of said thermo-responsive element.

30. In a percolator having an electric heating unit, the combination of a thermostatically controlled switch comprising a pair of spring members, contacts between said spring members and means on the outside of said percolator for separating said spring members and their contacts at a predetermined time period.

31. In an electrically heated vessel the combination of two separate and independently operating heating means for independently heating said vessel, heat controlled operating means operated by the heat generated by the first heating means for timing said first heating means, said heat controlled operating means causing the operation of the second heating means to assume the heating of said vessel independently of said first heating means and keep said first heating means substantially inactive during the heating of the vessel by said second heating means.

32. In a percolator having an electric heating unit, a thermostatically controlled switch for the control of said heating unit, adjustable means for affecting the operation of said switch and fixed indicating means on the outside of said percolator and cooperating with said adjustable means to indicate predetermined time intervals for the operation of said switch.

33. In an electrically heated vessel, a first electrical heating element, a second electrical heating element, a thermostatic switch in heat actuating relation with both of said heating elements, means controlled by said thermostatic switch whereby the latter in a first one of its positions deenergizes said second heating element, and means for materially reducing the current passing through said first heating element upon the actuation of said thermostatic switch into a second one of its positions, said thermostatic switch and said second heating element being so arranged that said second heating element when energized maintains said thermostatic switch into said second one of its positions.

34. In an electrically heated vessel, a first electrical heating element, a second electrical heating element, a thermostatic switch in heat actuating relation with both of said heating elements and connected in shunt with said second heating element, said thermostatic switch being maintained in its open position by the energization of said second heating element, and means for materially reducing the current passing through said first heating element upon actuation of said thermostatic switch into its open position.

ABE O. SAMUELS.
ALVIN DEWAYNE KEENE.